Jan. 12, 1937.　　　F. HNIZDO ET AL　　　2,067,848
SEMIAUTOMATIC TRANSMISSION CASE FOR AUTOMOBILES
Filed Nov. 14, 1934　　　2 Sheets-Sheet 1
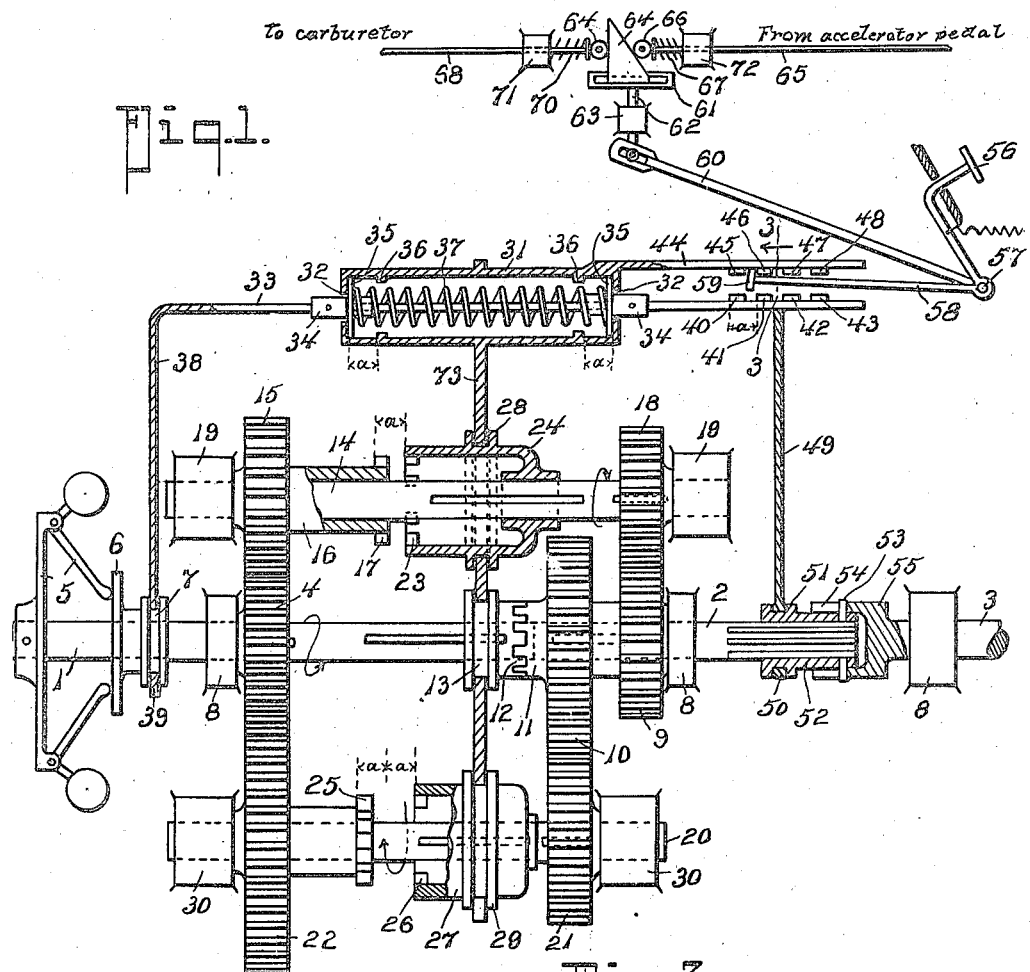
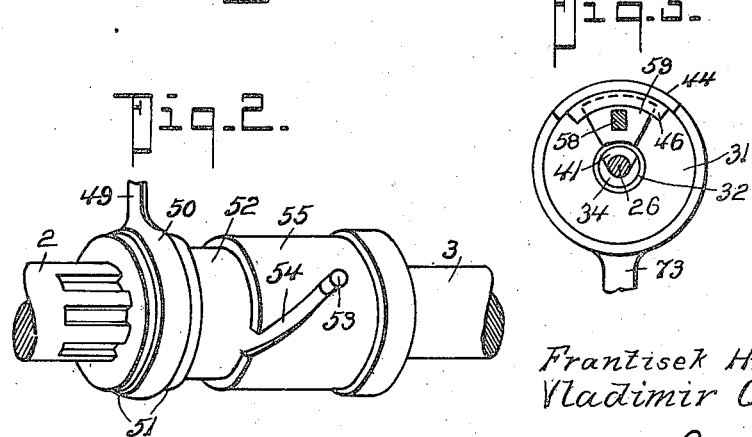
Inventor
Frantisek Hnizdo
Vladimir Obermajer
By B. Luiger
Attorney

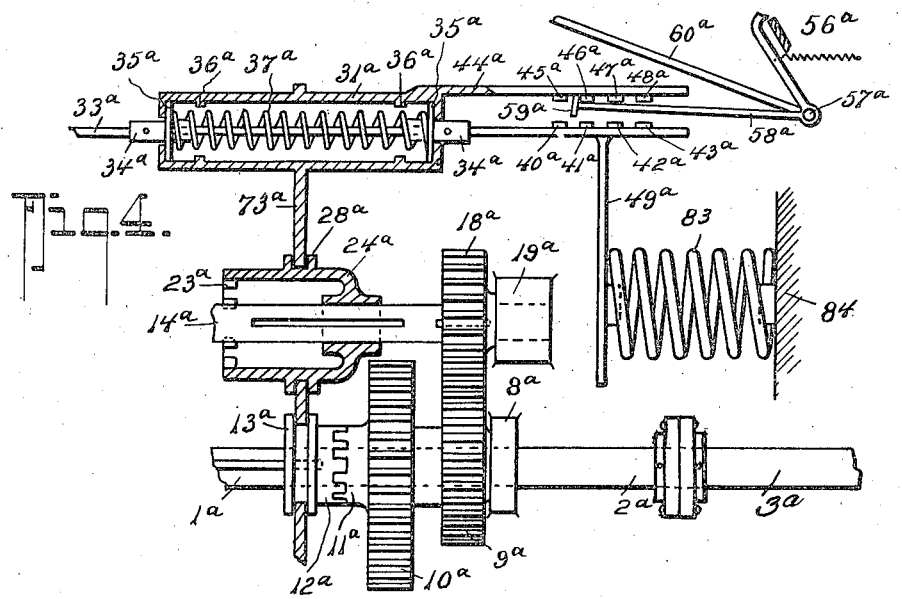
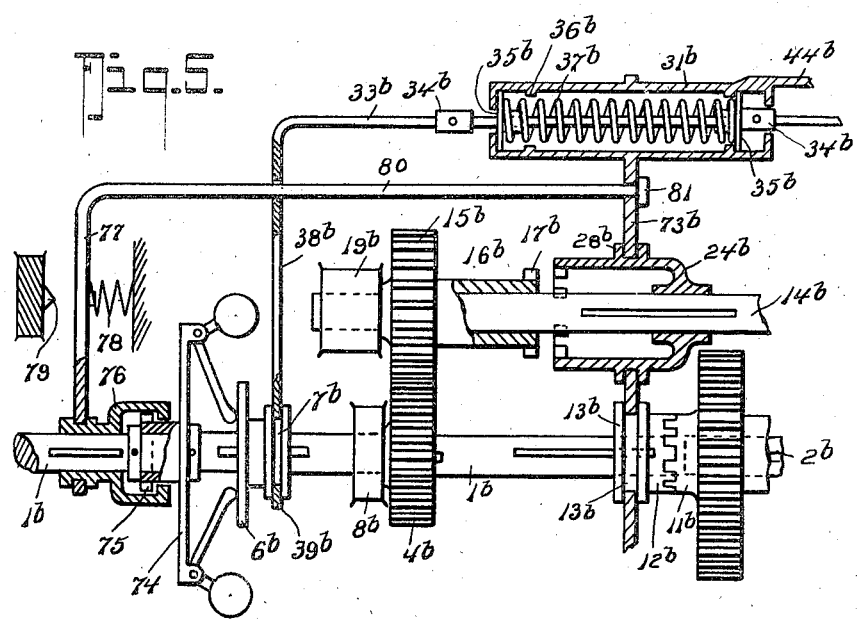

Patented Jan. 12, 1937

2,067,848

UNITED STATES PATENT OFFICE 2,067,848

SEMIAUTOMATIC TRANSMISSION CASE FOR AUTOMOBILES

František Hnízdo and Vladimír Obermajer, Prague, Czechoslovakia

Application November 14, 1934, Serial No. 753,053 In Czechoslovakia November 15, 1933

8 Claims. (Cl. 192—.01)

The object of our invention is to provide a semi-automatic transmission gear mechanism for the purpose of reducing the manual service required to operate an automobile.

Further, the invention has for an object to provide a transmisison mechanism in which the shifts from low through intermediate to high speed and back again are effected by the load on the engine, its speed, and the pressing in of the clutch pedal when it is the desire of the operator to effect the shifting of gears; the actual shifting of the gears is mechanically accomplished automatically within the gear box when the mechanism is released by the action of moving the clutch pedal in and out.

Other objects will in part be obvious and in part be pointed out hereinafter.

To the attainment of the aforesaid objects and ends the invention still further resides in the novel details of construction, combination and arrangement of parts, all of which will be first fully described in the following detailed description, and then be particularly pointed out in the appended claims, reference being had to the accompaning drawings, in which:—

Figure 1 is a general view, largely diagrammatic in character, illustrating one embodiment of our invention.

Figure 2 is a detail perspective view of one of the coupling members shown in Figure 1.

Figure 3 is an enlarged detail cross section on the line 3—3 of Figure 1, looking from right to left in that figure.

Figure 4 is a view similar to Figure 1, illustrating a modification of the invention, parts being omitted.

Figure 5 is another view similar to Figure 1, showing a second modification of the invention, parts being omitted.

In the drawings, in which like numerals and letters of reference indicate like parts in all the figures, 1 represents the engine or driving shaft, 2 an intermediate shaft, and 3 the driven shaft (the latter connecting with the differential mechanism of the rear axle, not shown). These three shafts are in alignment with one another and are mounted in suitable bearings, indicated diagrammatically at 8 in Figure 1 of the drawings. Secured to the shaft 1, to rotate with it constantly, is a gear 4. The gear 4 meshes with the gears 15 and 22, hereinafter again referred to.

On the shaft 1 is secured the rotating centrifugal governor 5 which cooperates with the shifting device through the plate 6 carried on a sleeve having a double flanged collar 7 to receive the fork 39 of the extension 38 of the power applying rod 33, hereinafter again referred to.

Keyed or otherwise secured to the shaft 2 are gears 9 and 10, the former meshing with a gear 18 and the latter meshing with a gear 21, hereinafter again referred to. The gear 10 has a clutch face 11 which is adapted to be engaged by the clutch face of the shiftable clutch element 12 that is slidably keyed or pinned to the shaft 1 and is provided with a double flanged collar 13 to receive the clutch shifting bar 73, later again referred to.

14 designates the intermediate speed countershaft which is mounted in suitable bearings 19 and on which loosely turns a gear 15, there being a second gear 18 splined to the shaft 14 to turn with it. The gear 15 has a clutch sleeve 16 having external teeth 17 to mesh with internal teeth 23 on a shiftable clutch element 24 which has flanges 28 to receive the clutch shifting bar 73, hereinbefore referred to. When the teeth 17 and 23 are brought into engagement the gear 15 is locked to rotate with the shaft 14 and hence the shaft 14 is driven from the shaft 1 through intermeshing gears 4 and 15, and in turn drives the shaft 2 through the intermeshing gears 18 and 9.

20 designates the low speed counter-shaft which is mounted in suitable bearings 30 and to which is splined the gear 21 which meshes with the gear 10. Another gear 22 turns loosely on the shaft 20 and constantly meshes with the gear 4. The gear 22 has a sleeve provided with external teeth 25 to mesh with the internal teeth 26 on a shiftable clutch member 27 having spaced flanges 29 to receive a fork of the clutch shifting bar hereinbefore referred to.

31 designates a tubular member having ends provided with apertures 32 through which passes a rod 33. Fastened to the rod 33 at each end of the tubular member 31 are collars 34 which project into the apertures 32 and rest against discs 35 which normally engage the end walls of the tubular member 31 and are held in such engagement by a coil spring 37 located on the rod 33 within the tubular member 31 and having limited movement in such tubular member between the ends thereof and suitably located stops 36. The rod 33 has an extension 38 which has a fork 39 to engage the double flanged collar 7, hereinbefore referred to.

The rod 33 carries a series of stops 40—41—42—43, spaced apart between their centers a distance equal to the distance through which the discs 35 are movable. The distance through which the discs 35 may move is indicated by the reference letter "a", as is also the distance between the centers of the stops 40—41, etc., and the distance through which the shifting clutch 24 must move to mesh its teeth 23 with the teeth 17.

The tubular member 31 has a bar extension 44 which is also provided with a set of stops 45—46—47—48, corresponding to the stops 40—41—42—43.

49 is a bar extending from the bar 33 and having a strap 50 engaging the double flanged collar 51 of a shiftable sleeve 52 that is keyed to the shaft 2 and has pins 53 operating in inclined slots 54 in the tubular connecting element 55 that is fixed to the shaft 3. The members 51—55 represent a screw or claw-coupling unit, the slots 54 of which engaging with the pins 53 are inclined helically. The slidable part of this coupling comprising members 51, 52, 53 is therefore forced away from the non-slidable member 54, 55 by the axial force, which depends on the coefficient of friction and the inclination of the slots 54 and is in direct proportion to the torque acting on the shaft 3. This force acts through double flanged collar 51 upon a bar 49 which is attached to the coupling rod 33, and is thereby transmitted to the rod 38 and the centrifugal governor 5. If either the torque on the shaft 5 and the axial force on the coupling 51—55 increases and if the number of revolutions of the motor or centrifugal governor 5 decreases, the rod 38 compresses the centrifugal governor 5, and the rod 33 is caused to compress the spring 37 by means of the collars 34 and discs 35. The centrifugal governor 5 and the slots 54 of the coupling must be so dimensioned that the desired speed is automatically preselected, i. e. that when the revolutions of the motor decrease to a certain degree, or when the torque through coupling 51—55 increases to a certain amount the spring 37 is compressed so that when a change of gear becomes advisable it is sufficient for the driver merely to press the clutch pedal whereby the automatically preselected speed ratio is brought into action.

When changing from a higher to a lower ratio the tubular member 31 moves in the direction towards the governor 5 and when changing from a lower to a higher ratio the tubular member 31 moves in the opposite direction, that is towards the coupling 51—55.

56 designates the usual clutch pedal which is pivotally mounted at 57, there being an arm 58 extending from the shaft 57 and secured to move with the clutch pedal 56, this arm 58 extending between the bars 33 and 44 and carrying a stop head 59 to engage in the spaces between adjacent stops 45—46, etc., or 40—41, etc., accordingly as the clutch pedal is released or depressed.

A second arm 60 on the shaft 57 moves with the clutch pedal 56, the arm being connected by a pin and slot connection to a vertically movable rod or bar 62 slidable in a support 63 and having a slotted head 61 in which a triangular block 64 is slidably mounted and movable up and down with the head 61 as the clutch lever is moved. 65 designates the rod from the accelerator pedal (not shown) which passes through a suitable guide 72 and carries a roller 66 which engages the triangular block 64 on its beveled or inclined side, a light spring 67 being provided for keeping the roller in contact with the triangular block.

68 is the rod to the throttle valve for operating the same, the rod being mounted in a suitable guide 71 and carrying a roller 69 which engages the vertical face of the triangular block 64, a light spring 70 being provided to hold the roller 69 in contact with the triangular block 64.

In the embodiment of the invention illustrated in Figure 4 of the drawings, those parts which correspond in structure and function to the same parts in Figure 1 bear the same reference numerals, plus the index letter "a", so a repetition of the description thereof is thought to be unnecessary. In the embodiment illustrated in Figure 4 the shafts 2a and 3a are directly coupled. The coupling constituted by the parts 52—55, inclusive, is omitted and in lieu thereof there is provided a spring which is located between the bar 49 and a fixed abutment 84.

In the modification of the invention illustrated in Figure 5 those parts which are of the same construction as in Figure 1 bear the same reference numerals, plus the index letter "b"; so a repetition of the description thereof is thought to be unnecessary. In this modification, however, the centrifugal governor 74 is mounted to rotate on the shaft 1b and it has a hub with an externally toothed portion 75 constituting one element of a clutch that cooperates with the internally toothed clutch member 76 that is keyed to the shaft 1 and is shifted by a portion 77 of a rod whose other portion 80 passes through an aperture 82 in the rod 73 and has a stop head 81 for a purpose presently made clear. The rod 77 is constantly urged from right to left in Figure 5 by a light spring 78, the movement under the influence of such spring being limited by the engagement of the same with a fixed stop 79.

*Operation*

Assume the parts to be in the position shown in Figure 1 and the engine and driven shaft running under direct connection through clutch 11—12. As the load on the shaft 3 increases (as when going up a hill, for example) and if the centrifugal governor 5 slows down, the bar 49 will be moved from right to left in Figure 1 to effect a compression of the spring 37. This movement takes place through a distance "a" due to the pin and slot connection 53—54. As soon as the right-hand disc 35 shall have come into engagement with the right-hand stop 36, this shifting movement of the bar 49 ceases. No shifting of the gears can take place, however, since the head 59 is in engagement with the stop 46. The operator now presses in on the clutch pedal 56 which brings the head 59 between stops 41 and 42 (these stops having been moved to the left by movement of the bar 49) and disengages from between the stops 45 and 46, thus releasing the bar extension 44 and consequently permitting the spring 37 to act on the tubular member 31 to move the clutches 24 and 27 from right to left in Figure 1 a distance "a", which unmeshes the clutch elements 11 and 12 and engages the clutch teeth 17 and 23, thereby effecting a shifting of the gears, i. e., releasing the direct connection between the shafts 1 and 2 and effecting an indirect connection through means of the gears 4—15, shaft 14 and gears 18 and 9, thereby putting the car into second. The movement of the head 59 into position between the stops 41 and 42 prevents further movement of the bar 49 from right to left in Figure 1. The operator then releases the clutch pedal, whereupon the head 59 will move from between the stops 41 and 42 and engage between the stop 46 and 47 and again hold the tubular member 31 against movement. Upon the return of the pedal, of course, the rod 33 will be released.

If the speed of the vehicle has slowed down so that the centrifugal governor does not press against the plate 6, the spring 37 will again be put under compression by a movement of the bar 49 from right to left, and then when the operator depresses the pedal 56 the second time the teeth 25 and 26 will be brought into mesh and the teeth 17 and 23 will be brought out of mesh by a further movement of the shiftable member 24 from right to left in Figure 1.

When the teeth 25 and 26 are in mesh, the teeth 23 will have passed beyond the teeth 17 and the clutch member 24 will rotate freely with the collar 16 projected into it.

As the clutch pedal 56 is pressed inwardly to release the stored-up energy of the spring 37 by releasing the bar 44, the arm 60 will be moved downwardly, thus pulling down on the triangular member 64. If the operator is holding the accelerator pedal stationary at this time, no movement will be imparted to the roller 66. However, as the wedge-shaped member is lowered, the spring 70 pressing the roller 69 from left to right in Figure 1 will cause the triangular member 64 to slide from left to right in the slotted head 61, thereby moving the rod 68 toward the right in Figure 1 and closing the throttle valve. Conversely, when pedal 56 is again released the wedge 64 will return the roller 69 to the position shown in Figure 1 and restore the throttle valve of the carburetor to its former position.

In shifting from low speed to intermediate and high, the reverse operations take place, the speed of the engine causing governor 5 to thrust the plate 6 from left to right in Figure 1 to store up energy in the spring. Pressing down the clutch pedal and releasing it will make the shift from low to intermediate. In shifting from intermediate to high the same operation takes place.

The operation of the embodiment of the invention illustrated in Figure 4 is essentially the same as that of Figure 1 with this exception: instead of applying the force necessary to shift from high speed through intermediate to low speed by means of a special coupling (such as shown in Figures 1 and 2), this coupling is omitted and the shaft 2 is directly connected to the shaft 3 in the usual manner. In lieu of the coupling shown in Figure 2 the spring 83 is provided. When the gearing is set for direct drive on high speed and the engine is running at the required speed the centrifugal governor 5a effects compression of the spring 83 through its action on the disc 6a transmitted via bar 33a—33a—49a. When the number of revolutions of the engine decreases (due to the slowing down of the vehicle under increased load) the pressure on the disc 6a is correspondingly relieved with the result that the pressure of the spring 83 moves the bar 49a toward the left and effects compression of the spring 37a. By then depressing and releasing the clutch the gears are shifted to second speed; by repeating the operation (with the engine continuing to slow down) the shift is made to first speed.

The operation of the embodiment of the invention illustrated in Figure 5 is somewhat different from that of the preceding embodiments. The centrifugal governor in this embodiment differs somewhat from that in the former embodiments in that the governor is freely rotatable on the shaft 1b and rotates with the shaft only when the teeth of the coupling 76 are in mesh with the teeth 75. This coupling is constantly pressed into engagement by the weak coil spring 78. However, when the bar 73b shifts into the highest speed (direct drive) it presses against the stop 81 and pulls over the rod 80, which causes the clutch elements 76 and 75 to be disengaged because the spring 37b is much stronger than the spring 78. The centrifugal governor 74 is thereby disconnected; its centrifugal force decreases (reaching zero when the governor stops) and the spring 37b is prepared for the low speed. When effecting the shift to the low speed by pressing in on the clutch pedal 56b and then freeing it, the bar 73b leaving the stop 81 allows the spring 78 to bring the coupling 76—75 into engagement again. Thus the centrifugal governor is once more put into rotation so that it can prepare the mechanism for the next shift. The coupling 76—75 is disconnected only while the gearing is in the direct drive position; at other times it is constantly in clutching engagement.

From the foregoing description, taken in connection with the accompanying drawings, it is thought that the construction, operation and advantages of the invention will be clear to those skilled in the art.

What we claim is:

1. In a semi-automatic transmission mechanism, a driving shaft and a driven shaft, a clutch connection between said shafts, a low speed counter-shaft and an intermediate speed counter-shaft, constantly meshing gear connections between said driving shaft and said low speed and intermediate speed counter-shafts and between said counter-shafts and said driven shaft, the gears on said counter-shafts which mesh with a gear on said driving shaft being normally loose, a low speed clutch and an intermediate speed clutch cooperating with the respective loose gears, a single clutch-shifting bar for shifting all of said clutches to effect a low speed drive, an intermediate speed drive or a high speed drive accordingly as said bar is in one position or another, a spring actuated device cooperating with said bar to effect the shifting acts, a pedal with means normally holding said spring actuated devices inactive and adapted to release the same at will, means governed by the speed of the drive shaft for storing up energy in and setting said spring actuated devices in readiness to function upon being released by movement of said pedal.

2. In a semi-automatic transmission mechanism, a driving shaft and a driven shaft in cooperation with a three-speed gear set the gears of which are in constant mesh and the couplings of which are effected by settings of shiftable clutches; in combination with a centrifugal governor operated by the driving shaft, a shifting cylinder and power spring assembly, means operated by the governor for compressing the power spring in one direction, other means to apply compression to said power spring in the opposite direction, operative connections between the shifting cylinder and the clutches to effect the gear shifts, and manually actuated means cooperatively connected with said shifting cylinder and power spring assembly to withhold or permit the operation of the same at the will of the operator, said other means comprising another spring whose action is opposed to that of said governor.

3. In a semi-automatic transmission mechanism wherein is provided an engine shaft, a driven shaft, a three-speed constant mesh gear set and shiftable gear-clutching elements, means to shift the clutching elements in accordance with the speed of the engine shaft, and a clutch pedal for controlling the shifting acts; in combination with a throttle valve actuating rod and an accelerator pedal, and means governed by the clutch pedal and cooperating with said rod to control the throttle valve, without movement of the accelerator pedal, so that the engine will not be raced if unloaded by releasing the connection between the engine shaft and the driven shaft.

4. In combination, a semi-automatic transmission mechanism which includes a clutch pedal control; an accelerator pedal-operated throttle valve controlling rod comprising two sections with ends opposed, the opposed ends of said sections being separated and engaged by a wedge shaped element, means to mount said wedge shaped element for movement with the rod and for movement in and out from between the ends of the rod sections, and means for connecting said wedge shaped element with said clutch pedal in virtue of which upon depressing said clutch pedal the throttle valve controlling rod will be moved to close the carburetor to prevent racing of the engine, without changing the position of the accelerator pedal.

5. In a semi-automatic transmission mechanism, a driving shaft, an intermediate shaft, and a driven shaft, a low speed counter-shaft, an intermediate speed counter-shaft, a driving gear secured on said driving shaft, a pair of gears secured on said intermediate shaft, a gear secured on said low speed counter-shaft and constantly meshing with one of said gears on said intermediate shaft, a gear secured on said intermediate speed counter-shaft and constantly meshing with the other gear that is secured on said intermediate shaft, a loose gear on each counter-shaft constantly meshing with the gear secured on said driving shaft, a shiftable clutch connection between said driving shaft and said intermediate shaft, a shiftable clutch connection on said low speed counter-shaft for connecting the loose gear thereon to the shaft at times, a shiftable clutch connection on said intermediate speed counter-shaft for connection with the loose gear thereon at times, a single clutch shifting means including a bar connected with the several shiftable clutch members, a cylinder connected to said bar, a compression spring in said cylinder, a rod passing through said spring and cylinder, discs on said rod within said cylinder to engage either end of said spring and the ends of said cylinder, stops on said rod to engage said discs, means for limiting the movement of said stops and discs to limit the compression of said spring in the cylinder, a centrifugal governor on the driving shaft to compress said spring in one direction, other means to compress said spring in the other direction, a set of control stops on said rod, a bar connected to said cylinder and carrying a set of control stops, and a pedal-operated arm with a head to cooperate with said sets of control stops for controlling the action of said clutch shifting means.

6. In a semi-automatic transmission mechanism, a driving shaft, an intermediate shaft, and a driven shaft, a low speed counter-shaft, an intermediate speed counter-shaft, a driving gear secured on said driving shaft, a pair of gears secured on said intermediate shaft, a gear secured on said low speed counter-shaft and constantly meshing with one of said gears on said intermediate shaft, a gear secured on said intermediate speed counter-shaft and constantly meshing with the other gear that is secured on said intermediate shaft, a loose gear on each counter-shaft constantly meshing with the gear secured on said driving shaft, a shiftable clutch connection between said driving shaft and said intermediate shaft, a shiftable clutch connection on said low speed counter-shaft for connecting the loose gear thereon to the shaft at times, a shiftable clutch connection on said intermediate speed counter-shaft for connection with the loose gear thereon at times, a single clutch shifting means including a bar connected with the several shiftable clutch members, a cylinder connected to said bar, a compression spring in said cylinder, a rod passing through said spring and cylinder, discs on said rod within said cylinder to engage either end of said spring and the ends of said cylinder, stops on said rod to engage said discs, means for limiting the movement of said stops and discs to limit the compression of said spring in the cylinder, a centrifugal governor on the driving shaft to compress said spring in one direction, other means to compress said spring in the other direction, a set of control stops on said rod, a bar connected to said cylinder and carrying a set of control stops, and a pedal-operated arm with a head to cooperate with said sets of control stops for controlling the action of said clutch shifting means, said other means comprising a spring.

7. In a semi-automatic transmission mechanism, a driving shaft, an intermediate shaft, and a driven shaft, a low speed counter-shaft, an intermediate speed counter-shaft, a driving gear secured on said driving shaft, a pair of gears secured on said intermediate shaft, a gear secured on said low speed counter-shaft and constantly meshing with one of said gears on said intermediate shaft, a gear secured on said intermediate speed counter-shaft and constantly meshing with the other gear that is secured on said intermediate shaft, a loose gear on each counter-shaft constantly meshing with the gear secured on said driving shaft, a shiftable clutch connection between said driving shaft and said intermediate shaft, a shiftable clutch connection on said low speed counter-shaft for connecting the loose gear thereon to the shaft at times, a shiftable clutch connection on said intermediate speed counter-shaft for connection with the loose gear thereon at times, a single clutch shifting means including a bar connected with the several shiftable clutch members, a cylinder connected to said bar, a compression spring in said cylinder, a rod passing through said spring and cylinder, discs on said rod within said cylinder to engage either end of said spring and the ends of said cylinder, stops on said rod to engage said discs, means for limiting the movement of said stops and discs to limit the compression of said spring in the cylinder, a centrifugal governor on the driving shaft to compress said spring in one direction, other means to compress said spring in the other direction, a set of control stops on said rod, a bar connected to said cylinder and carrying a set of control stops, and a pedal-operated arm with a head to cooperate with said sets of control stops for controlling the action of said clutch shifting means, said other means comprising a shiftable coupling between said intermediate shaft and said driven shaft and a connection between said coupling and said rod.

8. In a semi-automatic transmission mechanism, a driving shaft, an intermediate shaft, and a driven shaft, a low speed counter-shaft, an intermediate speed counter-shaft, a driving gear secured on said driving shaft, a pair of gears secured on said intermediate shaft, a gear secured on said low speed counter-shaft and constantly meshing with one of said gears on said intermediate shaft, a gear secured on said intermediate speed counter-shaft and constantly meshing with the other gear that is secured on said intermediate shaft, a loose gear on each counter-shaft constantly meshing with the gear secured on said driving shaft, a shiftable clutch connection between said driving shaft and said intermediate shaft, a shiftable clutch connection on said low speed counter-shaft for connecting the loose gear thereon to the shaft at times, a shiftable clutch connection on said intermediate speed counter-shaft for connection with the loose gear thereon at times, a single clutch shifting means including a bar connected with the several shiftable clutch members, a cylinder connected to said bar, a compression spring in said cylinder, a rod passing through said spring and cylinder, discs on said rod within said cylinder to engage either end of said spring and the ends of said cylinder, stops on said rod to engage said discs, means for limiting the movement of said stops and discs to limit the compression of said spring in the cylinder, a centrifugal governor on the driving shaft to compress said spring in one direction, other means to compress said spring in the other direction, a set of control stops on said rod, a bar connected to said cylinder and carrying a set of control stops, and a pedal-operated arm with a head to cooperate with said sets of control stops for controlling the action of said clutch shifting means, said centrifugal governor being loose on said driving shaft, a clutch for connecting said governor to said driving shaft, and means to disconnect said governor clutch only while the gear set is connected for the high speed or direct drive.

FRANTIŠEK HNÍZDO.
VLADIMÍR OBERMAJER.